(12) United States Patent
Condon et al.

(10) Patent No.: US 8,622,092 B1
(45) Date of Patent: Jan. 7, 2014

(54) PIPE CONNECTION MEMBER FOR CONNECTING A PIPE TO A PAIR OF PARALLEL BRACKETS

(75) Inventors: Duane R. Condon, Ramona, CA (US);
Frank D. Julian, Kansas City, MO (US);
Truman J. Stegmaier, Lee's Summit, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 0 days.

(21) Appl. No.: 13/561,140

(22) Filed: Jul. 30, 2012

Related U.S. Application Data

(63) Continuation of application No. 12/102,259, filed on Apr. 14, 2008, now abandoned, which is a continuation-in-part of application No. 11/557,883, filed on Nov. 8, 2006, now Pat. No. 8,061,390.

(60) Provisional application No. 60/735,242, filed on Nov. 9, 2005.

(51) Int. Cl.
*F16L 3/00* (2006.01)

(52) U.S. Cl.
USPC .......... 138/107; 138/106; 248/67.7; 248/611; 248/73; 248/74.2; 248/214

(58) Field of Classification Search
USPC ............. 138/106, 107; 248/611, 57, 67.7, 73, 248/74.2, 74.4, 74.5, 214, 223.41, 229.14
See application file for complete search history.

(56) References Cited

U.S. PATENT DOCUMENTS

| | | | |
|---|---|---|---|
| 647,945 A | 4/1900 | Cope | |
| 949,576 A | 2/1910 | Hunter | |
| 1,047,159 A | 12/1912 | Bowers | |
| 1,156,885 A | 10/1915 | Caine | |
| 1,288,024 A | 12/1918 | Kendig | |
| 1,667,025 A | 4/1928 | Bowers | |
| 2,246,189 A | 6/1941 | Rugg et al. | |
| 2,442,340 A | 6/1948 | Buchanan et al. | |
| 2,528,400 A | 10/1950 | Trowbridge | |
| 2,610,816 A | 9/1952 | Vote | |
| 2,628,799 A | 2/1953 | Aaby | |
| 2,692,697 A | 10/1954 | Hamilton et al. | |
| 2,719,047 A | 9/1955 | Bayes et al. | |
| 3,009,167 A | 11/1961 | Leonard, Jr. | |
| 3,021,103 A | 2/1962 | Beyerle | |
| 3,082,987 A | 3/1963 | Robinson | |
| 3,216,025 A | 11/1965 | Roll | |
| 3,430,662 A | 3/1969 | Guarnaschelli | |
| 3,606,217 A | 9/1971 | Leiferman | |
| 3,718,307 A | 2/1973 | Albanese | |

(Continued)

*Primary Examiner* — James Hook
(74) *Attorney, Agent, or Firm* — Erickson, Kernell, Derusseau & Kleypas, LLC

(57) ABSTRACT

A pipe connection member for connecting a pipe to a pair of parallel brackets includes a pair of clamping members. Each clamping member has a pipe receiving opening extending therethrough. The inner sides of the clamping members cooperate to form a pair of parallel channels sized to receive the brackets. At least one fastener interconnects the clamping members for drawing them toward one another and against the brackets. One of the clamping members further includes a collet having integrally formed fingers extending outwardly around its pipe receiving opening. The other clamping member includes a countersink sized and positioned to receive the fingers such that as the clamping members are drawn toward one another the fingers are compressed against a pipe extending through the pipe receiving openings to fasten the pipe to the pipe connection member.

10 Claims, 8 Drawing Sheets

(56) References Cited

U.S. PATENT DOCUMENTS

| | | |
|---|---|---|
| 3,854,684 A | 12/1974 | Moore |
| 4,149,693 A | 4/1979 | LoNigro |
| 4,842,548 A | 6/1989 | Bolante |
| 4,907,766 A | 3/1990 | Rinderer |
| 5,050,824 A | 9/1991 | Hubbard |
| 5,060,892 A | 10/1991 | Dougherty |
| 5,072,072 A | 12/1991 | Bawa et al. |
| 5,209,444 A | 5/1993 | Rinderer |
| 5,230,488 A | 7/1993 | Condon |
| 5,271,588 A | 12/1993 | Doyle |
| D346,546 S | 5/1994 | Tesmar, Jr. |
| 5,469,882 A | 11/1995 | Condon |
| 5,516,068 A | 5/1996 | Rice |
| 5,667,185 A | 9/1997 | Maglica |
| 5,676,339 A * | 10/1997 | Simon ............................... 248/56 |
| 5,794,897 A | 8/1998 | Jobin et al. |
| 6,158,066 A | 12/2000 | Brown et al. |
| 6,352,224 B1 | 3/2002 | Collins |
| 6,375,128 B1 | 4/2002 | Condon et al. |
| 6,402,096 B1 | 6/2002 | Ismert et al. |
| 6,435,568 B1 | 8/2002 | Fukano et al. |
| 6,467,611 B2 | 10/2002 | Ambs et al. |
| 6,467,734 B1 | 10/2002 | Brown et al. |
| 6,519,791 B2 | 2/2003 | Randolph |
| 6,789,774 B2 | 9/2004 | Painchaud |
| 6,796,335 B1 | 9/2004 | Hubbard et al. |
| 6,860,454 B1 | 3/2005 | Gronowicz, Jr. |
| 6,902,138 B2 | 6/2005 | Vantouroux |
| 7,062,851 B2 | 6/2006 | Koessler |
| 7,278,190 B2 | 10/2007 | Fischer et al. |
| 7,407,176 B2 | 8/2008 | McJunkin et al. |
| 7,484,698 B2 | 2/2009 | Budagher |
| 7,527,225 B1 | 5/2009 | Schulz et al. |
| 7,614,593 B2 | 11/2009 | McClure et al. |
| 7,658,351 B2 | 2/2010 | Hansen |
| 7,770,341 B2 | 8/2010 | Fox |
| 8,141,831 B2 * | 3/2012 | Julian et al. .............. 248/220.21 |

* cited by examiner

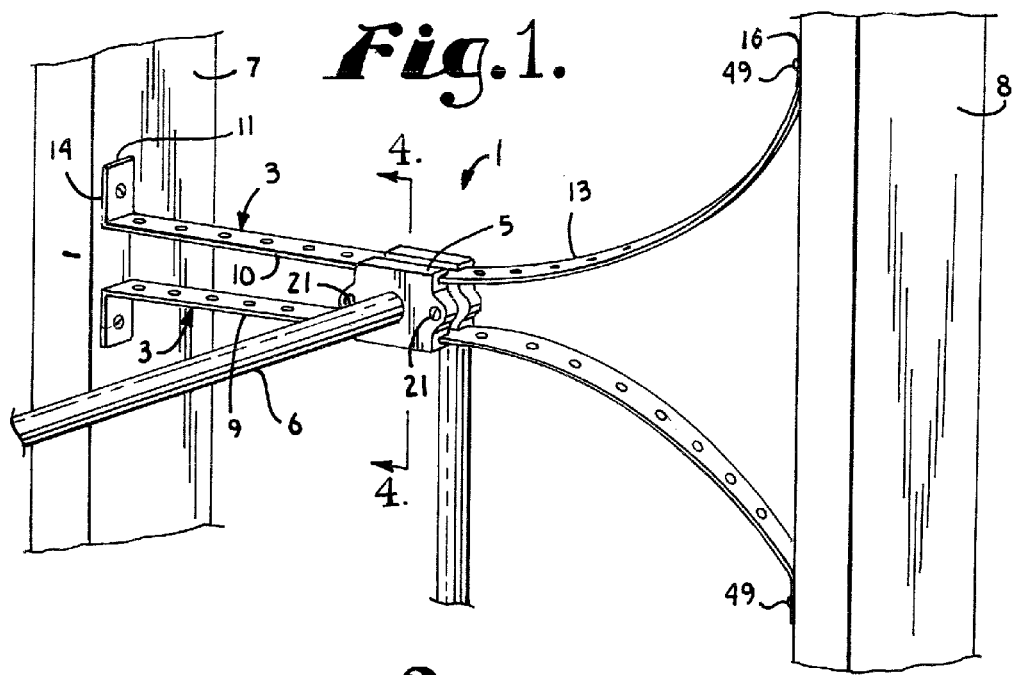
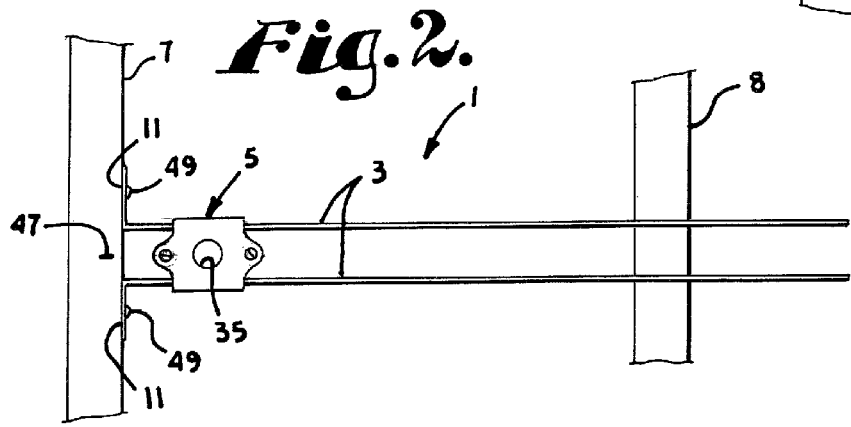
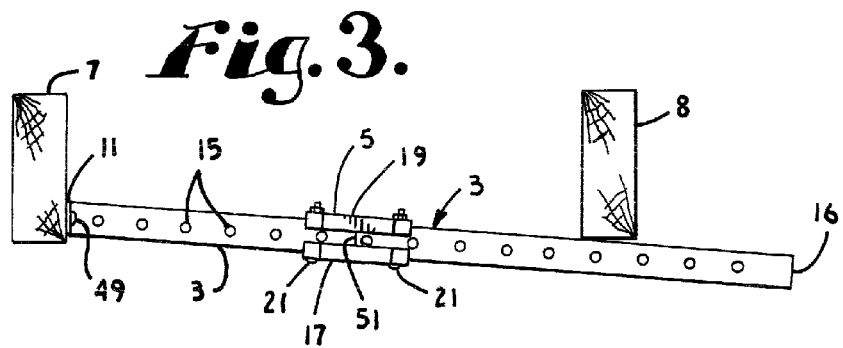

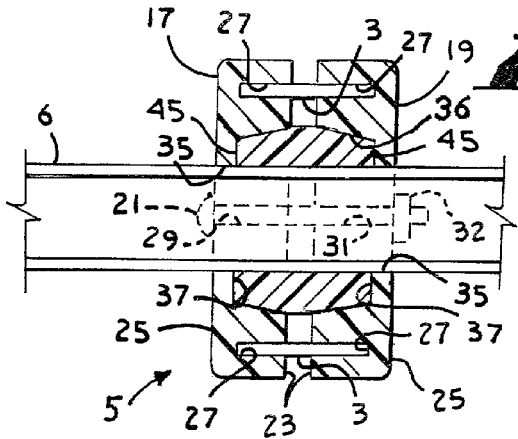
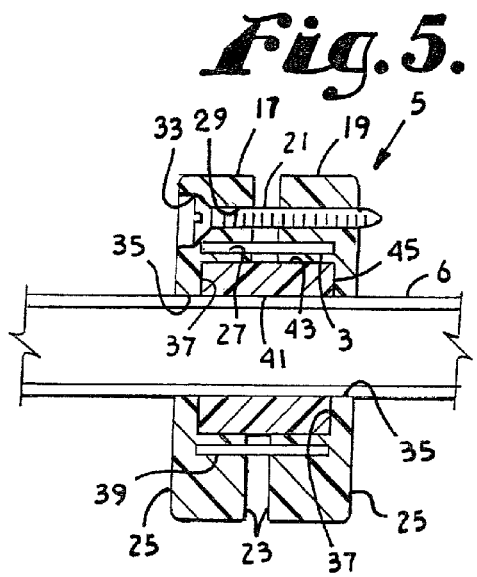
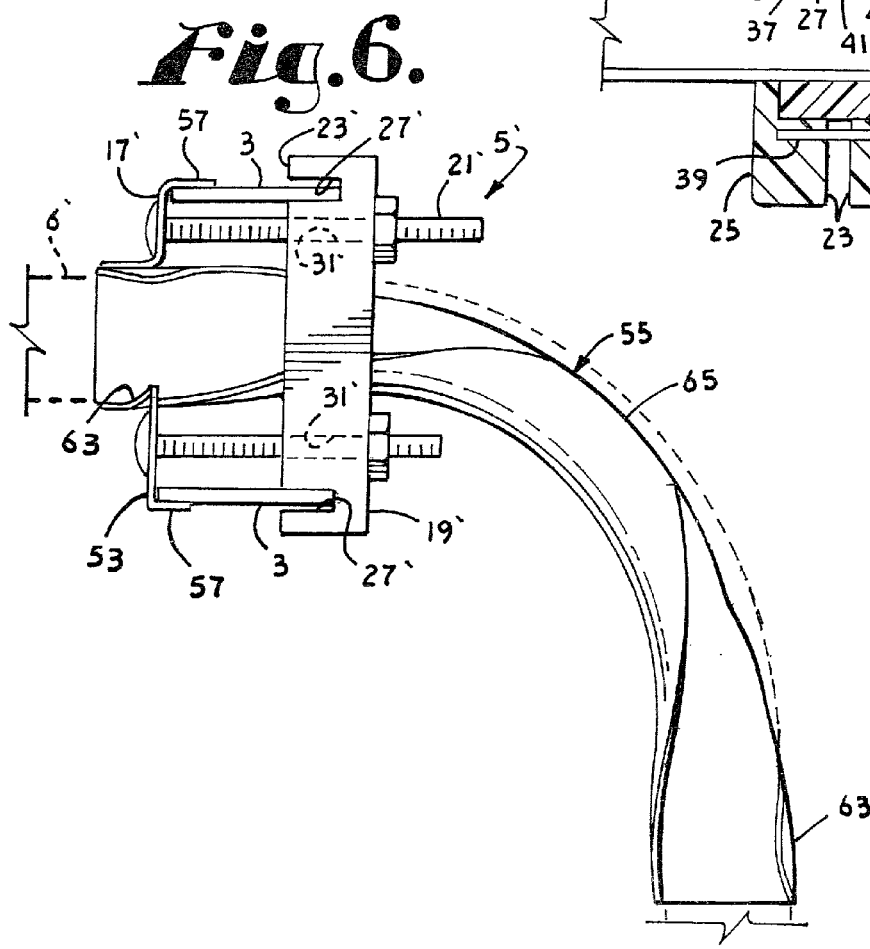

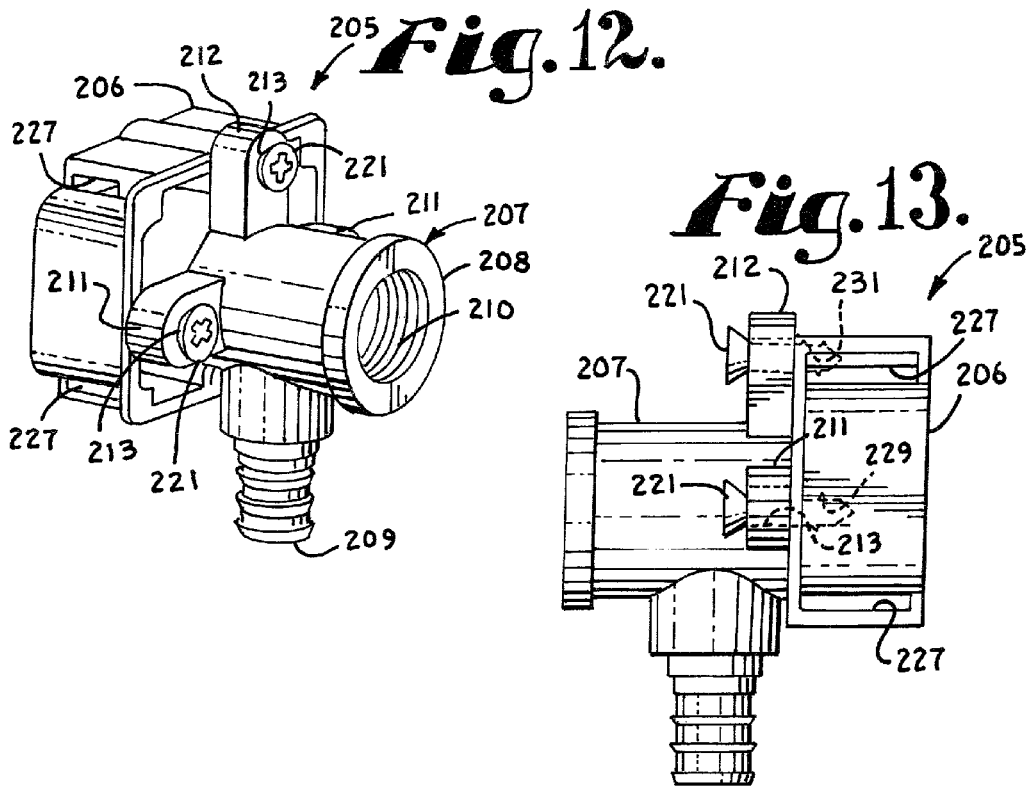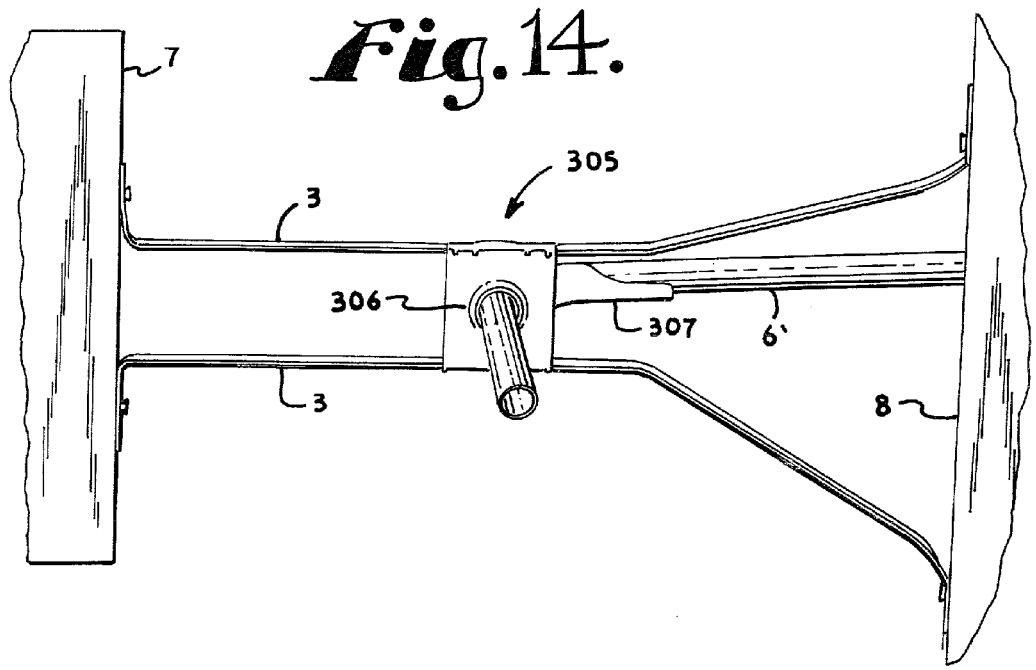

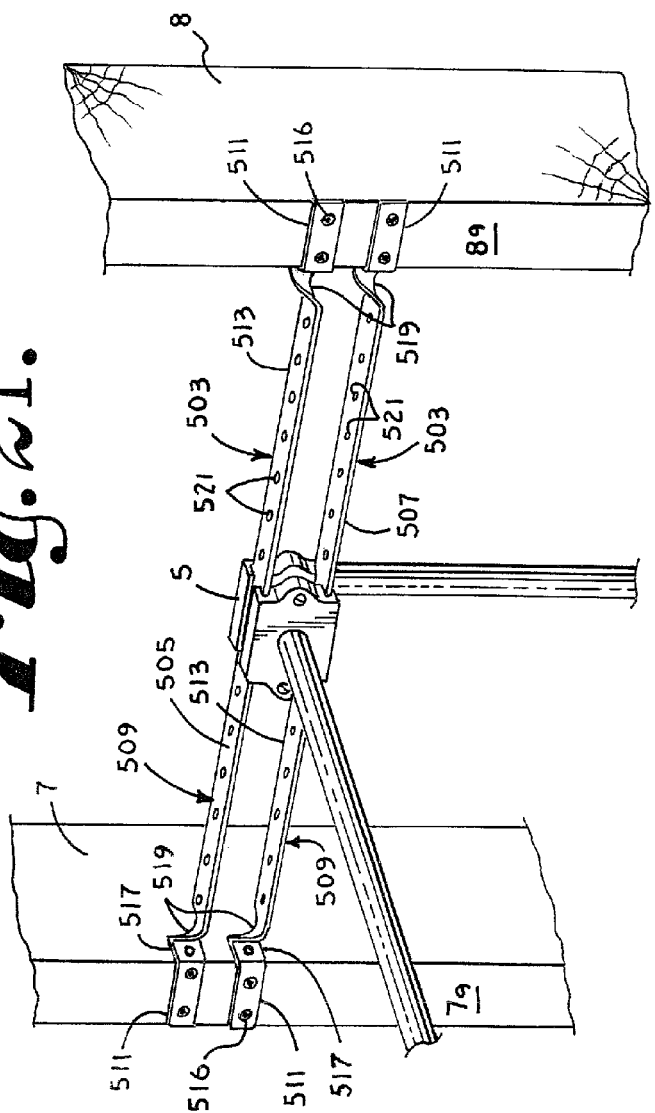
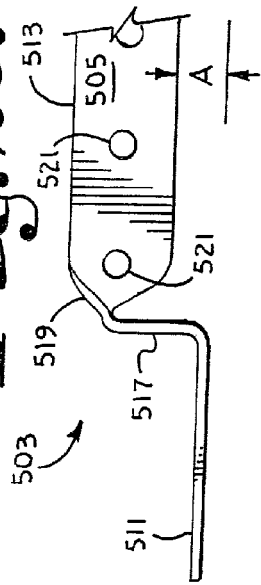
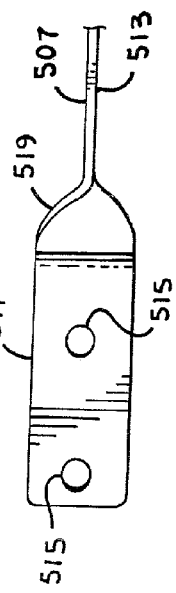

PIPE CONNECTION MEMBER FOR CONNECTING A PIPE TO A PAIR OF PARALLEL BRACKETS

This application is a continuation of application Ser. No. 12/102,259, filed Apr. 14, 2008, which is a continuation in part of application Ser. No. 11/557,883 filed Nov. 8, 2006, now U.S. Pat. No. 8,061,390, which claimed the benefit of provisional application Ser. No. 60/735,242 filed Nov. 9, 2005.

BACKGROUND OF THE INVENTION

1. Field of the Invention

This invention relates to hangers for supporting pipes between building members, such as wall studs, and in particular to a pipe hanger system having a pair of flexible brackets which extend between the building members and a pipe connection member which is selectively slidable along the brackets and then securable in position relative to the brackets.

2. Description of the Related Art

Stub-outs for faucets, showerheads, and the like are typically supported between wall studs by a plumbing support bracket. For example, U.S. Pat. No. 4,550,451 to Hubbard discloses a simple bracket having pipe receiving openings spaced along its entire length. The bracket is attachable to the outer edges of adjacent studs by inserting fasteners such as nails or screws through fastener openings located intermediate the pipe receiving openings. The pipe for the stub-out is typically soldered to the bracket in order to fix it in position.

Plumbing support brackets of this type have several shortcomings. Firstly, the brackets can be difficult to position in such a manner that the pipe is in the exact location desired. No matter how many pipe openings are provided, the position of the pipe is not universally adjustable. If the bracket is fastened to the studs and no pipe opening is in the desired position, the bracket must be taken down and relocated. Even then, there is no guarantee that the pipe can be properly positioned. Also, soldering the pipes to the bracket is labor intensive and can result in failure of the pipe. In order to allow pipes to be soldered to the brackets, prior art support brackets have been coated with copper oxide after fabrication, a process which produces a very thin layer of copper which can easily burn off during soldering, thereby exposing the steel and creating the potential for galvanic action with the pipes, which can cause leaks.

U.S. Pat. No. 5,469,882 discloses a valve fixture which includes a valve mounting plate slidably moveable along a pair of mounting straps extending between adjacent wall studs. The straps have relatively wide faces and relatively thin edges. The straps are nailed to the outer edges of the studs so that faces of the of the straps lie generally in the same plane. A valve, such as a shut-off valve for a faucet or commode is mounted on the valve mounting plate and connected to a water supply line. The valve mounting plate may be moved along the straps in order to position the valve into any desired location between the studs.

The fixture disclosed by the '882 patent provides universal adjustment of the location of the valve, but has a problem with lack of rigidity of the fixture. Because the straps are relatively thin and generally coplanar, they provide little resistance to flexion in a direction perpendicular to the wall, allowing for in and out movement of the valve and its associated supply pipe.

What is needed is a system for mounting a pipe which provides rigidity and universal adjustability of the pipe position, plus the ability to fix the pipe in position without soldering.

SUMMARY OF THE INVENTION

The present invention comprises a pipe hanger system for suspending a pipe between adjacent first and second building members. The system includes a pair of brackets and a pipe connection member selectively slidable along the brackets. The brackets are oriented with their wide dimensions lying in generally parallel planes lying perpendicular to the plane of the wall. In this orientation, the brackets provide excellent rigidity.

The brackets may each include an elongate leg and a foot extending outwardly from the leg at a first end thereof. The leg of each bracket is preferably longer than the distance between the building members. The feet of the brackets are first fastened to an inside surface of the first building member, which is typically a vertically extending wall stud or the like. The brackets are typically positioned with one above the other such that the brackets may be referred to as upper and lower brackets. The pipe connection member can then be slid onto the brackets and into the desired position. The pipe connection member is then fixed to the brackets in the desired position using one of several disclosed fixing means. The leg of the upper bracket is then bent upwardly and secured to the inside surface of the second building member. The leg of the lower bracket is similarly bent in a downward direction and secured to the inside surface of the second building member. The bending of the legs serves to add rigidity to the installation.

Alternatively, the brackets may each include a center section of a length selected to fit between adjacent building members on standard spacing and a pair of mounting tabs positioned on opposite ends of the center section. Inward of each mounting tab, the center section preferably includes a respective transverse leg which acts to offset the center section rearwardly from the mounting tabs. Inward of each transverse leg the center section further includes a respective ninety degree twist. The twists rotate the mounting portion such that it lies in a plane substantially perpendicular to a plane defined by the mounting tabs.

The pipe connection member includes pipe support means for supporting a pipe in an orientation extending generally parallel to the planes defined by the legs of the two brackets. The pipe connection member also includes means for fastening the pipe to the pipe connection member. For example, the pipe connection member may include front and rear clamping members positioned on opposite sides of the brackets, each of the clamping members including a respective pipe receiving opening sized to receive and support the pipe. The clamping members may be interconnected by at least one threaded fastener adapted for drawing said front and rear clamping members toward one another and against the brackets to fix the pipe connection member in position.

In one embodiment, an elastomeric ferrule is captured between the front and rear clamping members and concentric with the pipe receiving openings. In another embodiment, a collet formed integrally with one of the clamping members replaces the ferrule. In either of these embodiments, when the clamping members are drawn toward one another, the ferrule or collet is compressed against the pipe to fasten it to the pipe connection member. Other embodiments of the pipe connection member are also disclosed.

BRIEF DESCRIPTION OF THE DRAWINGS

FIG. 1 is a perspective view showing a pipe hanger system according to the present invention installed between a pair of building members.

FIG. 2 is a front elevational view of the system of FIG. 1 showing the system partially installed.

FIG. 3 is a top plan view of the partially installed system of FIG. 2.

FIG. 4 is a cross-sectional view of the system taken generally along line 4-4 in FIG. 1.

FIG. 5 is a view similar to that of FIG. 4 showing a modified version of the pipe connection member of FIGS. 1-4.

FIG. 6 is a side elevational view of a first alternative embodiment of the pipe connection member.

FIG. 12 is a perspective view of a fourth alternative embodiment of the pipe connection member.

FIG. 13 is a side elevational view of the pipe connection member of FIG. 12.

FIG. 14 is a front elevational view of the pipe hanger system installed between a pair of building members and showing a fifth alternative embodiment of the pipe connection member.

FIG. 21 is a perspective view showing a pipe hanger system according to the present invention installed between a pair of building members, wherein the system includes an alternative embodiment of the brackets.

FIG. 22 is a fragmentary, front elevational view of one of the brackets of FIG. 21.

FIG. 23 is a fragmentary, top plan view of one of the brackets of FIG. 21.

DETAILED DESCRIPTION OF THE PREFERRED EMBODIMENTS

Figure 7:
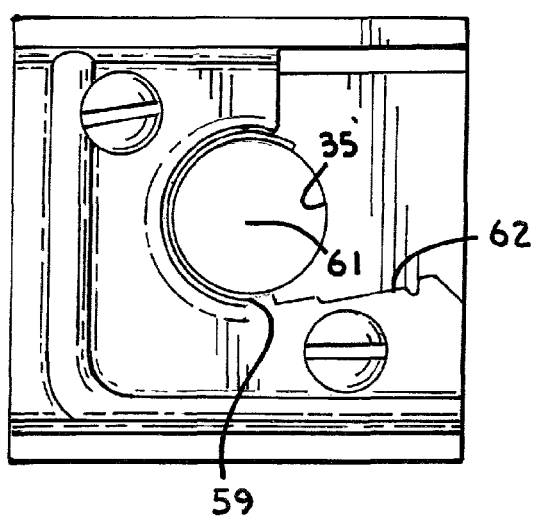
FIG. 7 is a front elevational view of the pipe connection member of FIG. 6.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIG. 1, the reference number 1 generally designates a pipe hanger system according to the present invention. The system 1 includes a pair of elongate brackets 3, and a pipe connection member 5 which is slidably mounted on the brackets 3. The system 1 is used for suspending a pipe 6, such as a pipe used as a stub-out for a tub spout, faucet or shower head, between adjacent building members, such as wall studs 7 and 8. As used herein, the word "pipe" is to be construed to include any tubular structure, which may be either substantially rigid or flexible.

The brackets 3 are formed of a rigid yet bendable material such as steel flat stock having a pair of faces 9 and a pair of edges 10. Each of the brackets 3 is generally L-shaped and includes a foot 11 which extends at a right angle to a respective leg 13 at a proximate end 14 thereof. A plurality of fastener receiving openings 15 (best seen in FIG. 3) are formed through each of the brackets 3 and extend between the faces 9 of the respective bracket 3. At least one of the fastener receiving openings 15 extends through the foot 11 of each bracket 3 and the remainder of the openings 15 are spaced along the length of the leg 13. Each leg 13 includes a distal end 16 opposite the foot 11.

Referring to FIGS. 3 and 4, the pipe connection member 5 generally comprises a pair of clamping members including a front clamping member 17 and a rear clamping member 19 which are interconnected by threaded fasteners 21 (two fasteners 21 shown). In a first embodiment of the pipe connection member 5, each of the clamping members 17 and 19 comprises a plate having an inner face 23 and an outer face 25. The inner face 23 of each of the clamping members 17 and 19 has a pair of parallel grooves or channels 27 formed therein. The grooves 27 are sized to receive the edges 10 of the brackets 3. The threaded fasteners 21 each extend through an opening 29 in the front clamping member 17 and threadably engage either a receiver 31 in the rear clamping member 19 (as shown in FIG. 5), or alternatively, a nut 32 positioned behind the receiver 31 (as shown in FIG. 4).

The legs 13 of the brackets 3 are inserted between the clamping members 17 and 19 and in engagement with the grooves 27, such that the pipe connection member 5 is selectively slidably moveable along the brackets 3. When the fasteners 21 are loosely installed the pipe connection member 5 is freely movable along the brackets 3. When the fasteners 21 are tightened, the clamping members 17 and 19 are compressed against the brackets 3, thereby preventing the pipe connection member 5 from sliding relative to the brackets 3. It should be noted that the pipe connection member 5 holds the two brackets 3 with the respective faces 9 thereof in a parallel relation to each other. This places the width of each bracket 3 (between the edges 10 thereof) in a horizontal orientation which gives the system 1 additional front-to-back rigidity.

In order to enhance the ability of the fasteners 21 to lock the pipe connection member 5 relative to the brackets 3, one or more of the openings 29 in the front clamping member 17 may include a countersink or counterbore 33, as shown in FIG. 5, which intersects a respective one of the grooves 27 such that a portion of the head of a fastener 21 seated in the countersink or counterbore 33 will bear directly against one of the edges 10 of the respective bracket 3, thereby allowing the head of the fastener 21 to bite into the bracket 3.

The pipe connection member 5 further includes pipe connection means for fixing the pipe 6 to the pipe connection member 5. For example, referring to FIGS. 4 and 5, the clamping members 17 and 19 may each include a respective pipe receiving opening 35 having a minimum diameter sized to receive the pipe 6. The openings 35 are positioned in alignment with one another such that the pipe 6 may be simultaneously received through both openings 35. Concentric with the pipe receiving opening 35 in each clamping member is a larger diameter counterbore 36 terminating in an annular flange or shoulder 37 proximate the outer face 25 of the respective clamping member 17 or 19. An elastomeric ferrule 39 having an inner surface 41, an outer surface 43 and opposed ends 45 is inserted into the counterbores 36 in the clamping members 17 and 19 from the inner faces 23 thereof such that the ends 45 bear against the shoulders 37. The inner diameter of the ferrule 39 is sized to receive the pipe 6 when the ferrule 39 is in a relaxed or uncompressed state. As the fasteners 21 are tightened down, the ferrule 39 is compressed between the clamping members 17 and 19 and the inner diameter of the ferrule 39 is thereby caused to be reduced such that the inner surface 41 bears against a pipe 6 extending therethrough. The force of the ferrule 39 bearing against the pipe 6 is sufficient to fix the pipe 6 relative to the pipe connection member 5.

As shown in FIG. 4, the counterbores 36 in the clamping members 17 and 19 may be tapered inwardly toward the shoulders 37, and the outer surface 43 of the ferrule 39 may be similarly inwardly tapered toward the ends 45 thereof. This tapered design acts to evenly disperse and thus maximize the clamping forces between the ferrule 39 and the pipe 6.

The clamping members 17 and 19 may be made from a relatively strong plastic such as ABS (acrylonitrile butadiene styrene), PVC (polyvinyl chloride), or glass filled nylon. It is also foreseen that he clamping members 17 and 19 may be stamped or otherwise formed of steel since copper pipe 6 may be isolated from the clamping members 17 and 19 by the elastomeric ferrule 39, thereby eliminating any risk of galvanic action between the dissimilar metals.

Referring to FIG. 2, to install a stub-out using the system 1, a plumber first takes a vertical measurement along the stud 7 and makes a mark 47 on the stud 7 corresponding to the desired height of the stub-out. The system 1 is preferably initially oriented with the pipe connection member 5 close to the feet 11 of the brackets 3 such that the plumber can accurately line up the center of the pipe receiving opening 35 in the front clamping member 17 with the mark 47. Once so aligned, the plumber installs a pair of fasteners 49, such as screws, through the fastener receiving openings 15 in the feet 11 and into an inner face of the stud 7, thereby fixing the height of the stub-out. Referring to FIG. 3, the plumber then slides the pipe connection member 5 along the brackets 3 while taking a horizontal measurement along one of the brackets 3 to determine the desired location of the stub-out between the studs 7 and 8, and makes a mark 51 on one of the brackets 3 to indicate the position of the clamping member 5. Referring again to FIG. 1, the pipe 6 for the stub-out is then inserted through the pipe receiving openings 35 and ferrule 39. The fasteners 21 are then tightened while keeping the clamping member 5 in alignment with the mark 51, thereby simultaneously fixing the horizontal location of the stub-out and locking the pipe 6 relative to the pipe connection member 5.

Once the pipe connection member 5 is fixed to the brackets 3, the legs 13 of the brackets 3 are bent outwardly until their respective distal ends 16 can be brought into contact with the inner face of the stud 8. Fasteners 49 are then installed through one or more of the fastener receiving holes 15 proximate the distal end 16 of each leg 13 and into the stud 8, thereby securing the brackets 3 to the studs 8. The outward angle created by bending the legs 13 adds additional bracing to the installation and increases the rigidity of the brackets 3 relative to the studs 7 and 8.

As shown in FIGS. 6 and 7, a first alternative embodiment of the pipe connection member 5 is used for supporting flexible pipe 6', such as PEX (cross-linked Polyethylene) tubing, and is designated herein as pipe connection member 5'. As was the case with the pipe connection member 5, the pipe connection member 5' includes a front clamping member 17' and a rear clamping member 19' connected by threaded fasteners 21'. The rear clamping member 19' is similar to the rear clamping member 19 of the pipe connection member 5 and includes an inner face 23' having a pair of parallel grooves or channels 27' formed therein. A plurality of fastener receivers 31' and a pipe receiving opening 35' extend through the rear clamping member 19'.

The front clamping member 17' includes a plate 53 and a tubing support 55 which is rigidly attached to the plate 53. The support 55 extends rearwardly from the front clamping member 17' and through the pipe receiving opening 35' in the rear clamping member 19'. The plate 53 includes a pair of rearwardly extending side flanges 57 spaced apart to receive the brackets 3 therebetween. The tubing support 55 generally comprises an arcuate trough sized to receive the flexible pipe 6' and support it through a ninety degree bend. The support 55 is generally semicircular in cross section and presents a pair of opposed edges 59 defining an elongate trough opening 61. The plate 53 includes a notch 62 intersecting the pipe receiving opening 35' through which the pipe 6' may be passed laterally into the support 55.

The support 55 is preferably shaped such that the flexible pipe 6' may be snapped into the opening 61 and retained therein in a bent configuration without additional clamping. Toward this end, the support 55 includes a pair of end portions 63 wherein the trough opening 61 is oriented to one side and a center portion 65 wherein the trough opening 61 is oriented upwardly, or at right angles to its orientation in the end portions 63. In the end portions 63 of the support 55 the edges 59 act to keep the pipe 6' bent. In the center portion 65 of the support 55 the edges 59 keep the pipe from slipping sideways out of the support 55. The friction between the support 55 and the pipe 6' is generally sufficient to keep the pipe 6' from pulling easily out of the support 55 in an axial direction.

When using the pipe connection member 5', the system 1 is installed in the same manner as described above for the pipe connection member 5, except that since the pipe 6' is flexible, it may be connected to the pipe connection member 5' either before or after it is moved into its final position along the brackets 3. Also, the tightening of the fasteners 21' to lock the pipe connection member 5' relative to the brackets 3 does not also lock the pipe 6' relative to the pipe connection member 5'.

The tubing support 55 serves as the pipe connection means for fixing the pipe 6' to the pipe connection member 5'.

Figure 8:
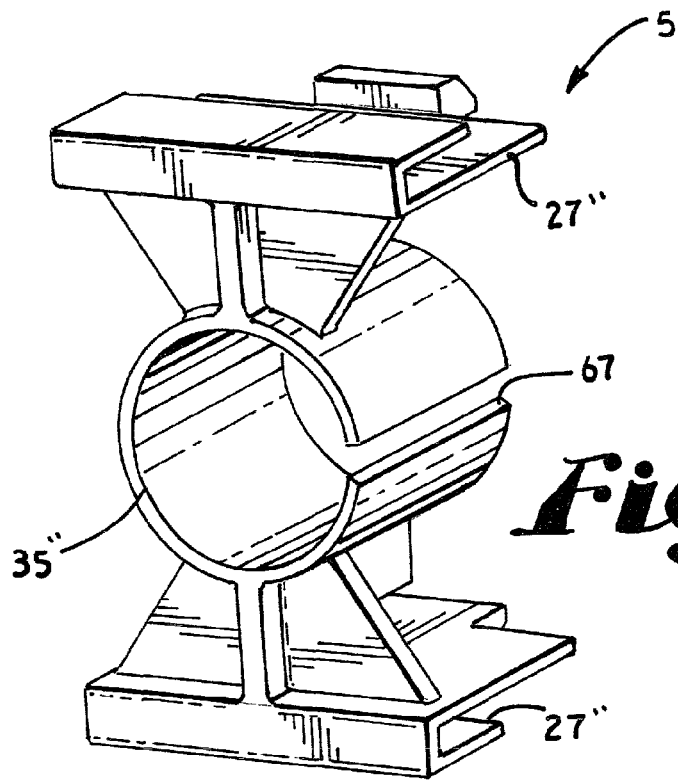
FIG. 8 is a perspective view of a second alternative embodiment of the pipe connection member.

A second alternative embodiment of the pipe connection member, pipe connection member 5" is shown in FIG. 8. Pipe connection member 5" is of a one-piece molded construction and includes upper and lower bracket receivers 27" for receiving the brackets 3 and a pipe receiving opening 35" for receiving the pipe 6. The pipe receiving opening 35" is sized to be an interference fit with the pipe 6 and includes a slot 67 which allows the opening 35" to expand to receive the pipe 6. The pipe connection member 5" is preferably molded of a material with sufficient resilience that the opening 35" will return to approximately its original size after the pipe 6 is inserted and thereby clamp around the pipe 6 to fasten the pipe 6 to the pipe connection member 5", thereby serving as the pipe connection means for fixing the pipe 6 to the pipe connection member 5". It is also foreseen that the pipe connection member 5" could be formed of the same material as the pipe 6 (for example ABS or PVC) and solvent welded to the pipe 6 using conventional adhesives.

Figure 9:
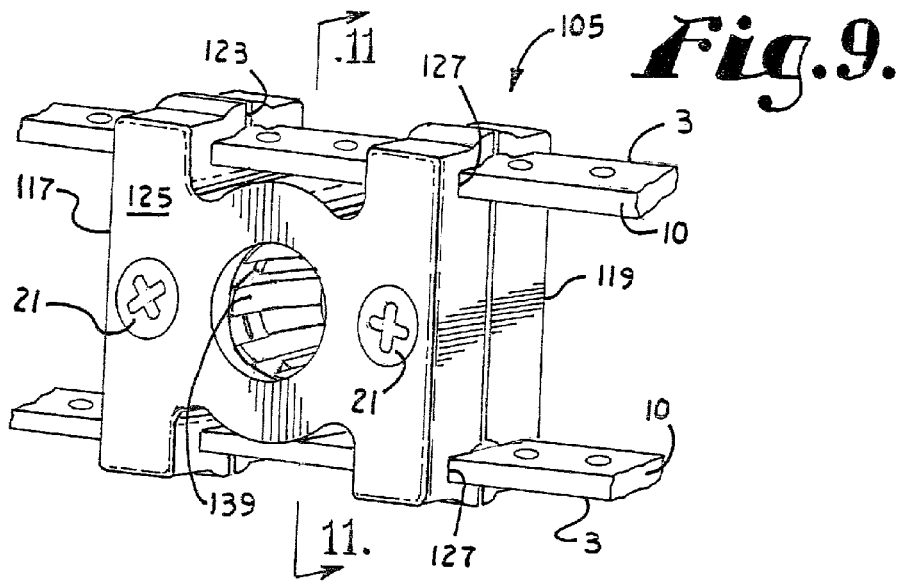
FIG. 9 is a perspective view of a third alternative embodiment of the pipe connection member.
Figure 10:
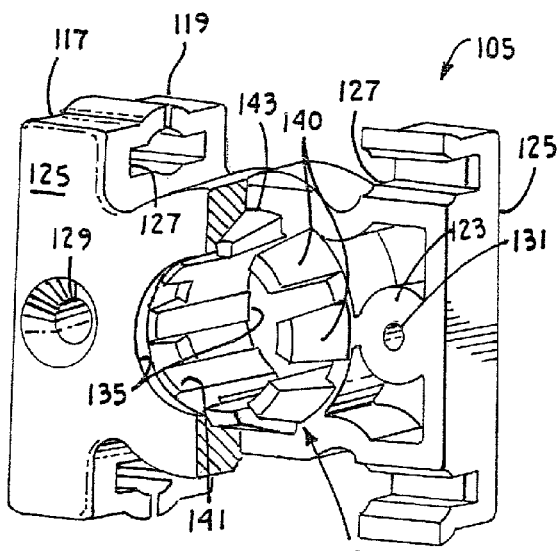
FIG. 10 a perspective view of the pipe connection member of FIG. 9 with a portion of the front clamping member thereof broken away.
Figure 11:
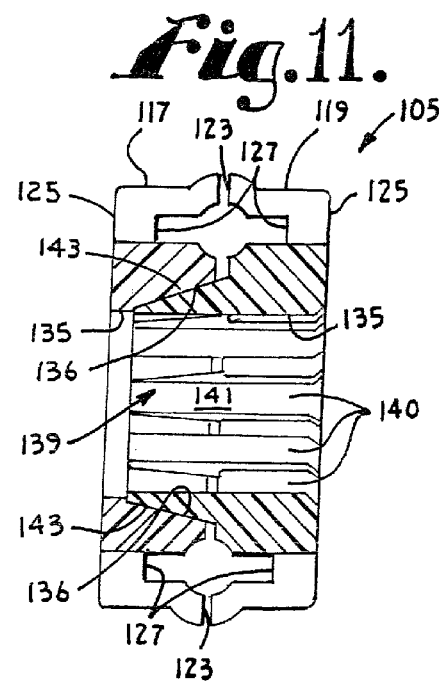
FIG. 11 is cross-sectional view of the pipe connection member of FIGS. 9 and 10 taken generally along line 11-11 in FIG. 9

A third alternative embodiment of the pipe connection member, pipe connection member 105 is shown in FIGS. 9-11. Pipe connection member 105 is similar to pipe connection member 5 except that instead of having a separate ferrule (such as elastomeric ferrule 39) which is compressed between front and rear clamping members, the pipe connection means of the pipe connection member 105 comprises a collet 139 which is integrally formed with either a front clamping member 117 or a rear clamping member 119.

Each of the clamping members 117 and 119 has an inner face 123 and an outer face 125. The inner face 123 of each of the clamping members 117 and 119 has a pair of parallel grooves or channels 127 formed therein. The grooves 127 are sized to receive the edges 10 of the brackets 3. Threaded fasteners 21 each extend through an opening 129 in the front clamping member 117 and threadably engage either a receiver 131 in the rear clamping member 119, or alternatively, engage a nut (not shown) positioned behind the receiver 131.

The clamping members 117 and 119 each include a respective pipe receiving opening 135 sized to receive the pipe 6. The openings 135 are positioned in alignment with one another such that the pipe 6 may be simultaneously received through both openings 135. The collet 139 is formed around one of the openings 135 (shown as the opening 135 in the rear clamping member 119) and includes a plurality of axially extending fingers 140 (eight shown). The fingers 140 each include a concave inner surface 141 shaped for abutment against the outer surface of the pipe 6 and an outer surface 143 which tapers inwardly along the length of the fingers 140 and away from the inner face 123 of the respective clamping member 117 or 119. The opening 135 in the other clamping member 117 or 119 includes an inwardly tapered counterbore 136 sized to receive the distal ends of the fingers 140.

The pipe connection member 105 is installed generally as described above in relation to the pipe connection member 5. When the threaded fasteners 21 are tightened with the distal ends of the fingers 140 received in the counterbore 136 and a pipe 6 extending through the openings 135, the fingers 140 of the collet 139 are compressed radially inwardly against the pipe 6 and thereby clamp the pipe 6 in position relative to the pipe connection member 105. Simultaneously, tightening of the fasteners 21 draws the clamping members 117 and 119 together and clamps the brackets 3 therebetween, thereby fixing the position of the pipe connection member 105 along the brackets 3.

A fourth alternative embodiment 205 of the pipe connection member is shown in FIGS. 12-13 and includes a mounting block 206 used in combination with a drop-ear elbow 207. Drop-ear elbows such as the elbow 207 are well known in the art and are commonly used for mounting shower arms and the like. The elbow 207 includes a body 208 having a vertical inlet 209 and a horizontal outlet 210. The inlet 209 may be configured to connect to pipe 6 of various types, including having a sweat connection for rigid copper pipe or a barb for receiving PEX tubing 6', as shown. The outlet 210 is typically internally threaded to receive a pipe 6 with external threads, such as a shower arm. A pair of horizontal mounting ears 211 extend outwardly from the body 208 on opposite sides thereof and a vertical mounting ear 212 extends outwardly perpendicular to the horizontal ears 211 and opposite the inlet 209. Each of the ears 211 and 212 includes a mounting hole 213 for receiving a respective threaded fastener 221.

The mounting block 206 is used to mount the drop-ear elbow 207 on the brackets 3 and includes a pair of parallel transverse slots 227 for slidably receiving the legs 13 of the brackets 3. A pair of fastener receivers 229 provided in the mounting block 206 are positioned for receiving the fasteners 221 extending through the mounting holes 213 in the horizontal ears 211. An additional fastener receiver 231 formed in the mounting block 206 is positioned to receive the fastener 221 extending through the mounting hole 213 in the vertical mounting ear 212. As best seen in FIG. 13, the fastener receiver 231 intersects one of the transverse slots 227 such that the fastener 221 installed through the vertical mounting ear 212 of the drop ear elbow 307 also bites into the face of the leg 13 of the respective bracket 3 inserted in the transverse slot 227 (not shown) and thereby fixes the position of the mounting block 206 relative to the brackets 3.

The mounting block 206 is installed by sliding the block 206 onto the brackets 3 with the legs 13 of the brackets 3 extending through slots 227 in the block 206. The drop-ear elbow 207 may be mounted to the mounting block 206 using fasteners 221 installed through the mounting holes 213 in the horizontal ears 211 either before or after the block 206 is slid onto the brackets 3. The block 206 is fixed in position by installing a fastener 221 through the mounting hole 213 in the vertical mounting ear 212. A pipe 6 (such as a shower arm) is connected to the pipe connection member 205 by threading an end of the pipe 6 into the outlet 210 of the drop-ear elbow 207.

Figure 15:
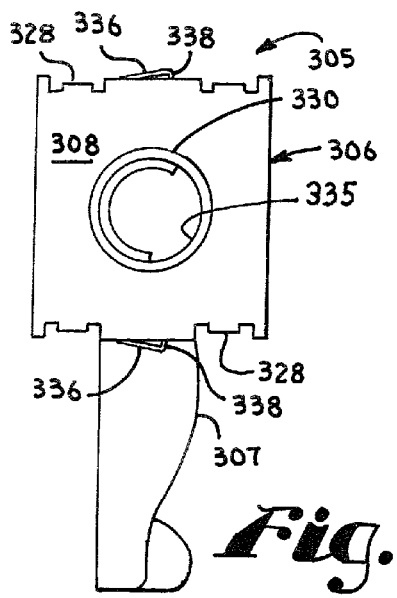
FIG. 15 is a front elevational view of the pipe connection member of FIG. 14.
Figure 16:
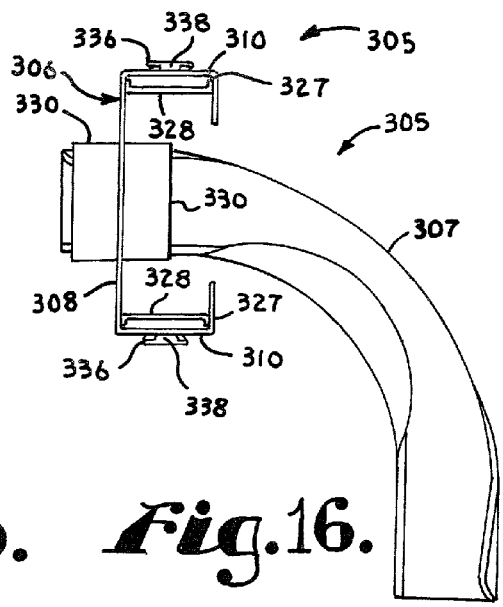
FIG. 16 is a side elevational view of the pipe connection member of FIGS. 14-15.
Figure 17:
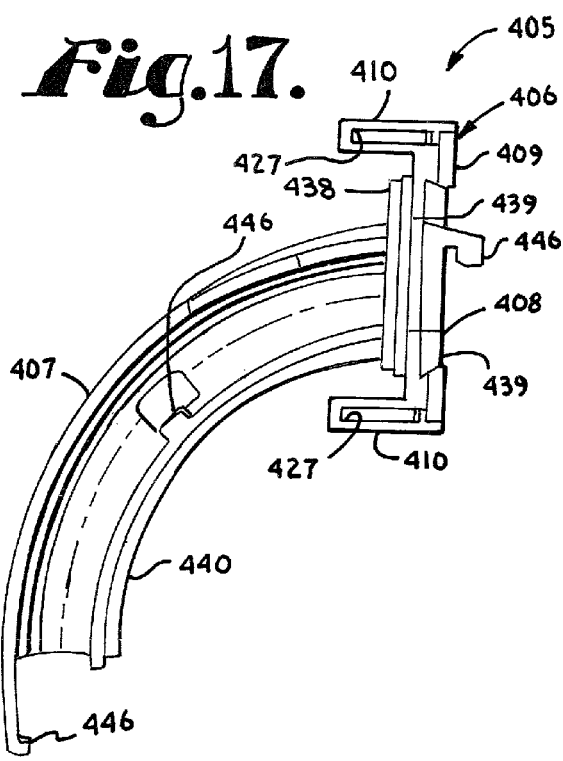
FIG. 17 is a side elevational view of a sixth alternative embodiment of the pipe connection member.
Figure 18:
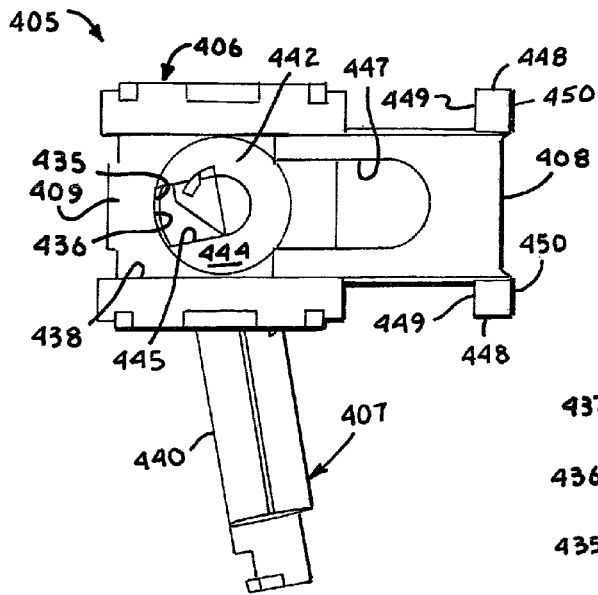
FIG. 18 is a front elevational view of the pipe connection member of FIG. 17 showing a locking wedge thereof partially installed.
Figure 19:
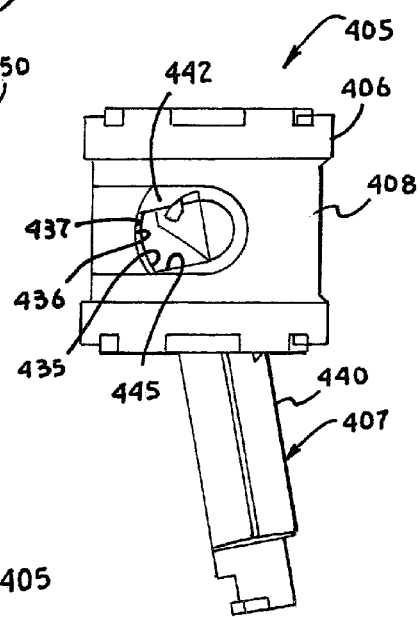
FIG. 19 is a view similar to FIG. 18 showing the locking wedge fully installed.
Figure 20:
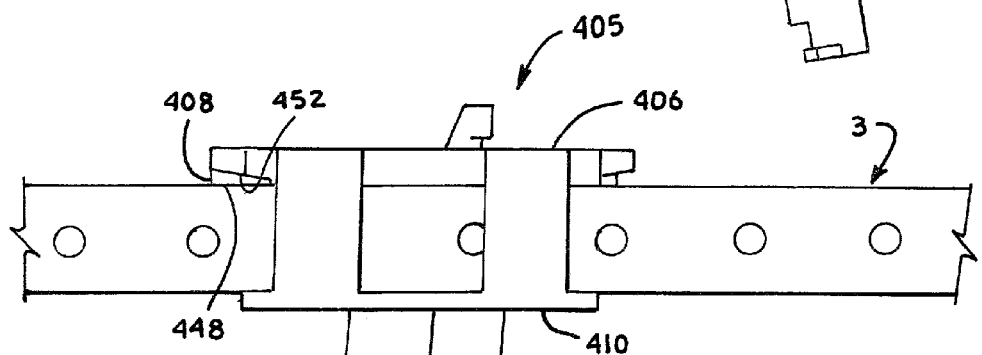
FIG. 20 is a top plan view of the pipe connection member of FIGS. 17-19.

A fifth alternative embodiment 305 of the pipe connection member is shown in FIGS. 14-16 is used for supporting a flexible PEX pipe 6' in a manner similar to pipe connection member 5' described above. Pipe connection member 305 includes a mounting block 306 and a pipe support 307 rotatably mounted to the mounting block 306 for 360 degree rotation. As best seen in FIG. 16, the mounting block 306 is formed of sheet metal and includes a front plate 308 and upper and lower edge flanges 310. Upper and lower bracket receivers 327 for slidably receiving the legs 13 of the brackets 3 are each formed between the respective edge flange 310 and a pair of saddles 328 formed by dividing portions of the respective outer flange 310 and bending them inwardly.

The pipe support 307 extends through a pipe receiving opening 335 in the front plate 308. The support 307 is identical to the support 55 described above, however, instead of being rigidly connected to the front plate 308, the support 307 is rotatably connected to the front plate 308 using a pair of collars 330. One of the collars 330 is fixed to the tubing support 307 (such as by spot welding) forward of the front plate 308 and the other collar 330 is similarly fixed to the tubing support 307 rearward of the front plate 308, such that the front plate 308 is captured between the collars 330.

The pipe connection member 305 is locked in position along the brackets 3 by means of tabs 336 formed on the edge flanges 310 of the mounting block 305. The tabs 336 are each bendable relative to the respective flange 310 and include a barb 338 which is engageable with any selected one of the openings 15 in the legs 13 of the brackets 3. To fix the pipe connection member 305 in position, the tabs 336 are bent inwardly until the barbs 338 are engaged with the selected openings 15. It should be noted, therefore, that the connection member 305 is securable to the brackets 3 at increments determined by the locations of the openings 15.

Referring to FIGS. 17-20, a sixth alternative embodiment 405 of the pipe connection member is a pipe connection member for flexible pipe 6'. The pipe connection member 405 includes a mounting block 406, a pipe support 407 rotatably mounted to the mounting block 406, and a locking wedge 408 for fixing the pipe connection member 406 in position relative to the brackets 3 and for securing the pipe support 407 to the mounting block 406. The components 406, 407 and 408 of the pipe support 407 may be formed of molded plastic.

The mounting block 406 includes a front plate 409 and upper and lower edge flanges 410. Upper and lower bracket receivers 427 for slidably receiving the legs 13 of the brackets 3 are each formed through and along the respective edge flange 410. The front plate 409 includes a pipe receiving opening 435 and a countersink 436 surrounding the pipe receiving opening 435. The countersink 436 forms an annular shoulder 437 around the pipe receiving opening 435. A dovetail groove 438 with opposed overhanging edges 439 is formed laterally across the front plate 409 forward of the countersink 436.

The pipe support 407 includes an arcuate trough 440 for receiving the flexible pipe 6' and a circular head 442. The head 442 includes a circular flange 444 sized to be rotatably received in the countersink 436 around the pipe receiving opening 435. A notch 445 formed in the head 442 allows the pipe 6' to be easily inserted into the trough 440. Retaining clips 446 integral with the pipe support 407 retain the pipe 6' in the trough 440. The pipe support 407 is installed in the mounting block 406 with the trough 440 extending through the pipe receiving opening 435 and the circular flange 444 seated in the countersink 436.

The locking wedge 408 is sized and shaped to be slidably received in the dovetail groove 438 of the mounting block 406 and retained by the overhanging edges 439 thereof. A notch 447 formed in one end of the wedge 408 is sized to provide clearance for a pipe 6' extending outwardly from the pipe support 407, but the width of the notch 447 is less than the diameter of the outer flange 444 of the head 442 on the pipe support 407. Thus, when the wedge 408 is slid into the dovetail groove 438, the outer flange 444 of the support 407 is captured between the wedge 408 and the annular shoulder 437 that forms the bottom of the countersink 436. The action of the wedge 408 capturing the flange 444 retains the support 407 in position relative to the mounting block 406.

The wedge 408 further includes a pair of ears 448 which extend outwardly from opposed sides of the wedge 408. The ears 448 are generally wedge-shaped, having a narrow leading edge 449 and a wider trailing edge 450. As the wedge 408 is slid into the dovetail groove 438, the ears 448 are received into respective wedge shaped gaps 452 formed between portions of the edge flanges 410 and the edges of the brackets 3. As the ears 448 are pressed into the gaps 452, the wedge shape of the ears 448 acts to tighten the edges of the brackets 3 against the inside of the bracket receivers 427, thereby fixing the position of the pipe connection member 405 relative to the brackets 3.

Referring to FIGS. 21-23, a pair of alternative brackets 503 may be used in place of the brackets 3 with one of the pipe connection members 5, 5', 5" or 105 (pipe connection member 5 shown), or with similar pipe connection members which accept the brackets 3 or 503 laterally into the respective bracket receivers. The brackets 503 will not work with pipe connection members such as the pipe connection members 205, 305 or 405 which require that the brackets be inserted longitudinally into the respective bracket receivers starting with an end of the respective bracket.

Like the brackets 3, the alternative brackets 503 are formed of a rigid yet bendable material such as steel flat stock or strap having a pair of faces 505 and a pair of edges 507. The brackets 503 each include a center section 509 and a pair of mounting tabs 511 positioned on opposite ends thereof. The center section 509 of each bracket 503 has a length selected to fit between adjacent building members on standard spacing, such as wall studs 7 and 8, and includes a mounting portion 513 which is twisted 90 degrees relative to the mounting tabs 511.

Looking at one of the brackets 503 in more detail, starting with the mounting tabs 511 and working inwardly therefrom, each mounting tab 511 has a length selected to generally extend across the narrow dimension of the respective building member 7 or 8 (approximately 1.5 inches for a standard 2×4 wall stud) and includes at least one fastener receiving opening 515 (two shown) formed therethrough. The fastener receiving openings 515 receive respective fasteners 516 (such as nails or screws) for securing the bracket 503 to respective the building member 7 or 8.

Immediately inward of each mounting tabs 511, the center section 509 includes a respective transverse leg 517. The transverse legs 517 act to offset the center section 509 of the bracket 503 rearwardly a distance A from the mounting tabs 511. The offset A provides clearance for the pipe connection member (such as pipe connection member 5 shown) between the front edge 507 of the bracket 503 and the wallboard which will be secured to the outer faces 7a and 8a of the building members 7 and 8. Inward of each transverse leg 517, the center section 509 further includes a respective ninety degree twist 519. The mounting portion 513 lies inward of the twists 519 and preferably includes a longitudinal row of openings 521 which may be used for locating the pipe connection member along the brackets 503.

In use, a pipe connection member, such as one of the pipe connection members 5, 5', 5" or 105 is selectively slidably mounted on a pair of brackets 503 with the mounting portions 513 of the brackets 503 extending through the respective bracket receiving channels or openings formed in the pipe connection member. The mounting tabs 511 are secured to respective outer faces 7a and 8a of the adjacent building members 7 and 8. Because of the 90 degree twists 519, the faces 505 of the mounting portions 513, will each lie in a plane generally perpendicular to the plane defined by the faces 7a and 8a of the building members 7 and 8 (or by the planes of the mounting tabs 511). The pipe 6 can then be installed through the pipe connection member and the pipe connection member can be fixed relative to the brackets 503 in the same manner as described above in relation to the brackets 3. The transverse legs 517 of the brackets 503 space the pipe connection member 5 rearwardly from the mounting tabs 511a distance sufficient to allow wallboard to be installed against the front faces 7a and 8a of the building members 7 and 8, respectively, without the pipe connection member 5 interfering with the wallboard.

It is to be understood that while certain forms of the present invention have been illustrated and described herein, it is not to be limited to the specific forms or arrangement of parts described and shown. For example, although the system 1 is been described and depicted herein as being for use in supporting a pipe 6 between adjacent wall studs, it is to be understood that the system 1 may also be used for suspending a pipe 6 below a building member, such as a joist, beam, rafter or top plate. Similarly, the system 1 may also be used to support a pipe above a joist, beam, sole plate, or the like. In these applications, the feet 11 of the brackets 3 would be fastened to the building member and the legs 13 of the brackets 3 will extend generally vertically. The distal ends 16 of the legs 13 may or may not be fastened to adjacent building members.

What is claimed and desired to be secured by Letters Patent is as follows:

1. A pipe connection member for connecting a pipe to a pair of parallel brackets, comprising:
    a) a front clamping member and a rear clamping member, each of said clamping members having respective inner and outer sides and a respective pipe receiving opening extending through the respective clamping member from said inner side to said outer side, said inner sides of said front and rear clamping members cooperating to form a pair of parallel channels, each said channel sized to receive a portion of a respective one of the brackets in the pair of parallel brackets when said front and rear clamping members are positioned on opposite sides of the brackets; and
    b) at least one fastener interconnecting said front and rear clamping members for drawing said inner sides of said front and rear clamping members toward one another and against the brackets to fix the position of said pipe connection member relative to the brackets;
    c) one of said clamping members further including a collet having fingers integrally formed thereon and extending outwardly therefrom concentric with the respective pipe receiving opening and the other of said clamping members including a countersink sized and positioned to receive distal ends of said fingers such that as said clamping members are drawn toward one another said fingers are compressed against a pipe extending through the pipe receiving openings to fasten the pipe to the pipe connection member.

2. The pipe connection member as in claim 1 for use with a pair of parallel brackets wherein each bracket in the pair has a pair of edges and a pair of faces, the faces being substantially wider than the edges, wherein said channels are sized and shaped to retain the brackets in said pipe connection member with their respective faces in a parallel orientation.

3. The pipe connection member as in claim 1 wherein each of said parallel channels includes a groove formed in the inner side of one of said clamping members, said groove sized to receive a portion of the respective one of the brackets.

4. The pipe connection member as in claim 1 wherein each of said parallel channels is formed by a pair of aligned grooves formed in the inner sides of both of said clamping members, each of said aligned grooves sized to receive a respective portion of the respective one of the brackets.

5. A pipe connection member for connecting a pipe to a pair of parallel brackets, comprising:
    a) a front clamping member and a rear clamping member, each of said clamping members having respective inner and outer sides and a respective pipe receiving opening extending through the respective clamping member from said inner side to said outer side, one of said clamping members having a pair of grooves formed in its inner side, said grooves cooperating with the inner side of the other of said clamping members to form a pair of parallel channels, each said channel sized to receive a respective portion of one of the brackets in the pair of parallel brackets when said front and rear clamping members are positioned on opposite sides of the brackets; and
    b) at least one fastener interconnecting said front and rear clamping members for drawing said inner sides of said front and rear clamping members toward one another and against the brackets to fix the position of said pipe connection member relative to the brackets;
    c) one of said clamping members further including a collet having fingers integrally formed thereon and extending outwardly therefrom concentric with the respective pipe receiving opening and the other of said clamping members including a countersink sized and positioned to receive distal ends of said fingers such that as said clamping members are drawn toward one another said fingers are compressed against a pipe extending through the pipe receiving openings to fasten the pipe to the pipe connection member.

6. The pipe connection member as in claim 5 for use with a pair of parallel brackets wherein each bracket in the pair has a pair of edges and a pair of faces, the faces being substantially wider than the edges, wherein said channels are sized and shaped to retain the brackets in said pipe connection member with their respective faces in a parallel orientation.

7. The pipe connection member as in claim 5 wherein said pair of grooves is a first pair of grooves and the other of said clamping members has a second pair of grooves formed in its inner side aligned with said first pair of grooves, said first and second pairs of aligned grooves cooperating to form said channels.

8. A pipe connection member for connecting a pipe to a pair of parallel brackets, comprising:
    a) a front clamping member and a rear clamping member, each of said clamping members having respective inner and outer sides and a respective pipe receiving opening extending through the respective clamping member from said inner side to said outer side, each of said clamping members having a groove formed in its inner side, said grooves each cooperating with the inner side of the other of said clamping members to form a pair of parallel channels, each said channel sized to receive a respective portion of one of the brackets in the pair of parallel brackets when said front and rear clamping members are positioned on opposite sides of the brackets; and
    b) at least one fastener interconnecting said front and rear clamping members for drawing said inner sides of said front and rear clamping members toward one another and against the brackets to fix the position of said pipe connection member relative to the brackets;
    c) one of said clamping members further including a collet having fingers integrally formed thereon and extending outwardly therefrom concentric with the respective pipe receiving opening and the other of said clamping members including a countersink sized and positioned to receive distal ends of said fingers such that as said clamping members are drawn toward one another said fingers are compressed against a pipe extending through the pipe receiving openings to fasten the pipe to the pipe connection member.

9. The pipe connection member as in claim 8 for use with a pair of parallel brackets wherein each bracket in the pair has a pair of edges and a pair of faces, the faces being substantially wider than the edges, wherein said channels are sized and shaped to retain the brackets in said pipe connection member with their respective faces in a parallel orientation.

10. The pipe connection member as in claim 8 wherein each said groove is a first groove and the other of said clamping members has a respective second groove formed in its inner side aligned with said first groove, said first grooves and second aligned second grooves cooperating to form said channels.

\* \* \* \* \*